United States Patent
Bulusu et al.

(10) Patent No.: US 9,251,347 B2
(45) Date of Patent: Feb. 2, 2016

(54) PROVIDING AN IMMUTABLE ANTIVIRUS PAYLOAD FOR INTERNET READY COMPUTE NODES

(75) Inventors: Mallik Bulusu, Olympia, WA (US); Robert Swanson, Olympia, WA (US); Vincent Zimmer, Federal Way, WA (US); Robert Bruce Bahnsen, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 13/993,540

(22) PCT Filed: Mar. 30, 2012

(86) PCT No.: PCT/US2012/031332
§ 371 (c)(1),
(2), (4) Date: Jun. 12, 2013

(87) PCT Pub. No.: WO2013/147825
PCT Pub. Date: Oct. 3, 2013

(65) Prior Publication Data
US 2014/0025941 A1    Jan. 23, 2014

(51) Int. Cl.
*G06F 15/16* (2006.01)
*G06F 21/56* (2013.01)
*G06F 21/57* (2013.01)
*G06F 9/44* (2006.01)
*G06F 9/00* (2006.01)
*G06F 17/00* (2006.01)

(52) U.S. Cl.
CPC ............ *G06F 21/561* (2013.01); *G06F 9/4401* (2013.01); *G06F 21/56* (2013.01); *G06F 21/575* (2013.01)

(58) Field of Classification Search
None
See application file for complete search history.

(56) References Cited

U.S. PATENT DOCUMENTS

| 5,708,776 | A | 1/1998 | Kikinis |
| 6,591,376 | B1 * | 7/2003 | VanRooven et al. ............ 714/36 |
| 7,103,529 | B2 | 9/2006 | Zimmer |
| 7,827,371 | B2 | 11/2010 | Yao |
| 7,877,809 | B1 | 1/2011 | Sutton et al. |
| 2002/0188836 | A1 | 12/2002 | Gurumoorthy et al. |
| 2003/0051127 | A1 | 3/2003 | Miwa et al. |

(Continued)

FOREIGN PATENT DOCUMENTS

KR    2002-0007090    1/2012

OTHER PUBLICATIONS

International Searching Authority, "Notification of Transmittal of the International Search Report and the Written Opinion of the International Searching Authority," mailed Sep. 28, 2012, in International application No. PCT/US2012/031332.

(Continued)

*Primary Examiner* — Shin-Hon Chen
(74) *Attorney, Agent, or Firm* — Trop, Pruner & Hu, P.C.

(57) ABSTRACT

In one embodiment, a method includes initializing a portion of a computing system in a pre-boot environment using a basic input/output system (BIOS) stored in a non-volatile storage of the computing system, launching a boot manager to enable a launch of an operating system (OS) payload, and if the OS payload is not successfully launched, executing an OS payload portion and an antivirus stack stored in the non-volatile storage to restore an integrity of the mass storage. Other embodiments are described and claimed.

25 Claims, 7 Drawing Sheets

(56) References Cited

U.S. PATENT DOCUMENTS

| | | |
|---|---|---|
| 2008/0005797 A1* | 1/2008 | Field et al. .................. 726/24 |
| 2008/0077973 A1* | 3/2008 | Zimmer et al. ................ 726/2 |
| 2008/0120499 A1 | 5/2008 | Zimmer et al. |
| 2008/0282350 A1* | 11/2008 | Khilnani et al. ............... 726/24 |
| 2009/0300370 A1 | 12/2009 | Yao |
| 2009/0319806 A1 | 12/2009 | Smith |
| 2011/0078799 A1 | 3/2011 | Sahita et al. |
| 2011/0138166 A1* | 6/2011 | Peszek et al. .................. 713/2 |

OTHER PUBLICATIONS

European Patent Office, Extended European Search Report mailed Oct. 6, 2015 in European Patent Application No. 12873162.7.

Korea Patent Office, Korean Office Action mailed Nov. 20, 2015 in Korean Patent Application No. 2014-7027393.

* cited by examiner

500

```
┌─────────────────────────────────────────────┐
│              Application                    │
│                 510                         │
└─────────────────────────────────────────────┘

┌─────────────────────────────────────────────┐
│         Application Framework               │
│                 520                         │
└─────────────────────────────────────────────┘
```

| Security Engine 530 | Libraries 540 | Runtime 550 — Core Libraries 552 / VM 554 |

```
┌─────────────────────────────────────────────┐
│                Kernel                       │
│                 560                         │
└─────────────────────────────────────────────┘

┌─────────────────────────────────────────────┐
│           Minimal Kernel/AV                 │
│                 570                         │
└─────────────────────────────────────────────┘

┌─────────────────────────────────────────────┐
│             System Software                 │
│                 580                         │
└─────────────────────────────────────────────┘
```

PROVIDING AN IMMUTABLE ANTIVIRUS PAYLOAD FOR INTERNET READY COMPUTE NODES

TECHNICAL FIELD

Embodiments relate to operations in pre-boot and post-boot environments of a variety of Internet ready compute nodes.

BACKGROUND

In many computer systems, a booting of the system occurs through a series of steps in which initialization is performed, self-testing occurs, a basic input/output system (BIOS) is loaded and executed, and finally control may be passed off to an operating system (OS). In many systems, a pre-boot environment enabled via code present in a non-volatile storage of the system can perform those operations. Accordingly, there is a risk that untrusted or errant third party code can corrupt the system, particularly in the pre-boot environment.

As one example, the Unified Extensible Firmware Interface (UEFI) specification, e.g., the UEFI Specification version 2.3.1 (dated Apr. 8, 2011), calls for the separation of pre-boot and boot environments into a variety of phases. However, in these phases both original equipment manufacturer (OEM) trusted code and third party untrusted/errant code can execute in the same privilege level, which can lead to an attack on the system.

As more compute devices provide for mobility and ready access to the Internet a challenge is posed in the plague of software viruses that primarily attack the compute node personality (such as a registry) and file system. In these common scenarios, virus attacks can render the compute node non-functional and hence useless, and can further lead to loss of vital user data. A user may attempt unsafe actions to recover the data, which may lead to infections of other systems with the same virus.

An additional problem is that antivirus (AV) software is usually installed on the same read-writeable media that contains the OS image as well as user data. This too poses a problem as in extreme scenarios of virus attacks, it is the AV software that is attacked and disabled from functioning.

BRIEF DESCRIPTION OF THE DRAWINGS

FIG. 4 is a block diagram of a software architecture for a platform in accordance with one embodiment.

DETAILED DESCRIPTION

In various embodiments, to enable more secure operation of Internet-ready computing devices, embodiments may provide at least a portion of an operating system (OS) kernel payload along with antivirus (AV) code in a non-volatile storage. Note that this code storage may be separate from a conventional location of the OS and furthermore it should be understood that this minimal OS portion and AV code are presented as a single package, rather than different code entities. Still further, it should be understood that this code package may be separate from a full OS kernel payload located in another storage of the computing device. Note that the location of this package storage can vary depending on the type of platform. Embodiments may be applicable to many different system types as will be described further below, from conventional desktop personal computers (PCs) to mobile, portable and other interconnected devices such as smartphones, Ultrabooks™, netbooks, laptop computers, tablet computers and so forth. Thus embodiments are not limited to any particular type of form factor and may be applicable to various Internet connectable compute devices of a wide variety.

In some embodiments, a shrink-wrapped OS payload can be included with an antivirus software stack that can be integrated into an on-board non-volatile storage (such as a flash memory that stores a BIOS). In one embodiment, the complete OS payload may be maintained inside the BIOS image, where flash protection schemes can be employed to guarantee the integrity of the OS image. In one embodiment, the volume in the non-volatile storage may store the whole kernel if it is small enough, such that it can enjoy the same BIOS projections such as where the OS is optimized with minimal ingredients such as file system support, memory management, and so forth. In other embodiments, this OS payload portion may correspond to a kernel loader. In such embodiments, additional techniques can be used to ensure that the portion of the recovery code on what is historically a mutable disk (e.g., a hard disk) is 'authentic.' Although the scope of the present invention is not limited in this regard these techniques may include a host protected area (HPA) for disk protection, a shadow master boot record (MBR), code signing as in a UEFI secure boot, a trusted execution (TXT) launch with a launch control policy stored in a trusted platform module (TPM) or other such techniques. As such, in one embodiment all AV code and a recovery kernel and its driver may be stored in a volume of the non-volatile storage that stores the BIOS. In some embodiments a virus definition of the antivirus stack can be securely updated using a secure mode of operation such as a system management mode (SMM).

Figure 1:
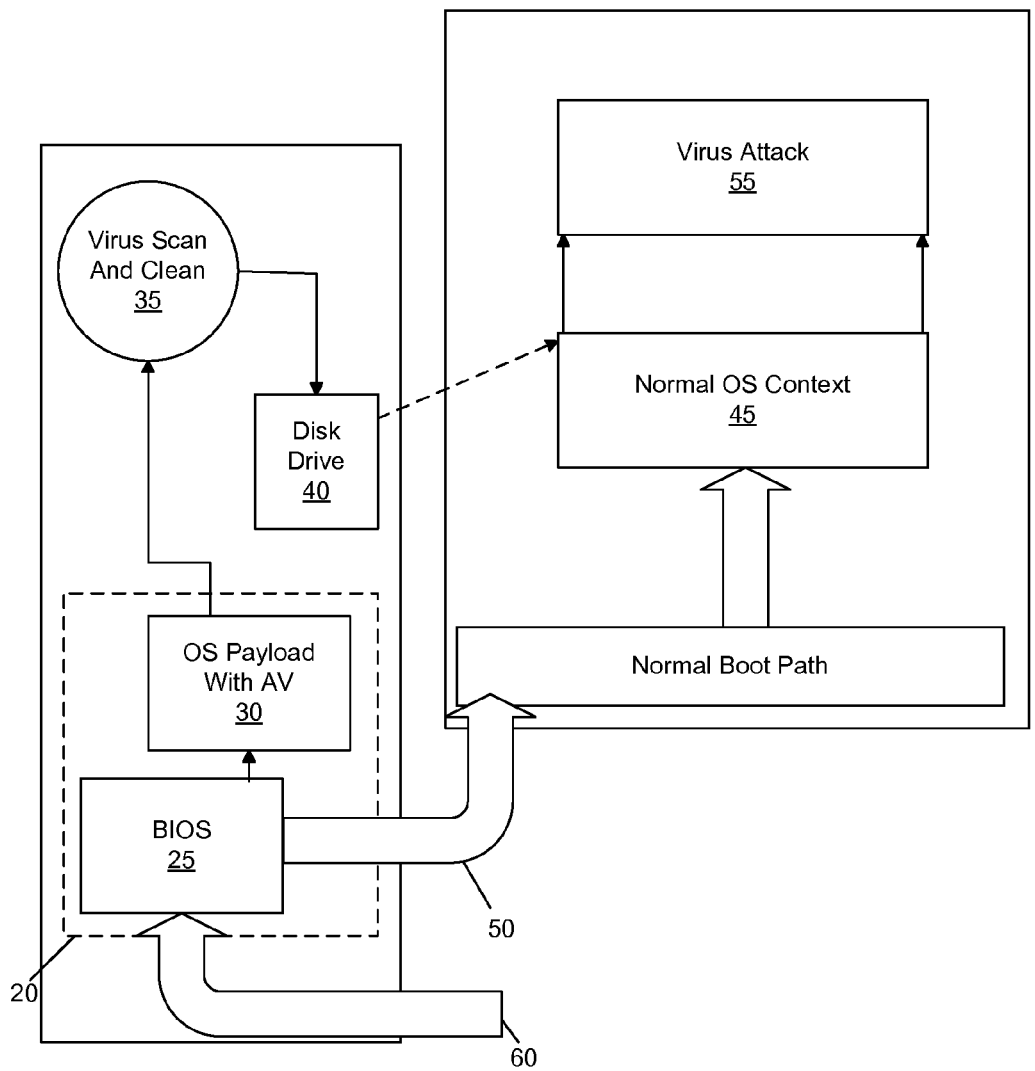
FIG. 1 is a high level block diagram illustrating a normal boot path and a recovery path in accordance with an embodiment.

Referring now to FIG. 1, shown is a high level block diagram illustrating a normal boot path and a recovery path in accordance with an embodiment of the present invention. As shown in FIG. 1, a system 10 can include a non-volatile storage 20 which may include a BIOS 25 and an OS payload 30 which includes the AV code. In various embodiments, this OS payload may be a relatively small portion of an entire OS kernel (and which can be a subset) and can include sufficient code to load itself into the memory subsystem, initialize a file system and, if all proceeds properly, pass control onto a full OS image, e.g., located on a disk drive 40. This is thus a normal boot path 50 in which a pre-boot environment is initially launched. In one embodiment, this pre-boot environment may be in accordance with a UEFI specification. The AV code in OS payload 30 may launch a temporary OS image that will validate the integrity of the permanent OS partition on disk drive 40. This will allow the system to repair the hard disk image while ensuring its AV software is fully functional.

If BIOS proceeds properly and all appropriate hardware of the system initializes correctly and no fault or corruptions are indicated, this normal boot path 50 may enable the full OS image on disk drive 40 to be launched to thus enter into a boot environment and normal system operations. If however, either during the boot process or during execution of code during normal operation according to a normal OS context 45, a virus attack 55 occurs such that a system error such as a fatal virus error has occurred, system 10 can enter into a recovery path 60.

In this recovery path 60, control can instead proceed through BIOS 25 and into OS payload 30. As mentioned above, this minimal OS kernel payload can include AV code, in addition to OS code to hoist itself into memory and provide for file system operations. This AV code may include various functions including virus checking functionality, e.g., to check various components of the system for a virus in accordance with a virus definition set stored as a virus definition database, e.g., present in OS payload 30 or another location. For example, other locations can include non-volatile storage of a trusted platform module (TPM), an AV cloud database service, a UEFI authenticated variable, BIOS, system management mode, or an embedded service/security processor. Furthermore, this AV code can further perform a virus scan and clean process 35, e.g., on an infected disk drive 40, to thus correct the problem and, via a reset mechanism, enable a boot into normal system operation. Although shown at this high level in the embodiment of FIG. 1, understand the scope of the present invention is not limited in this regard.

Figure 2:
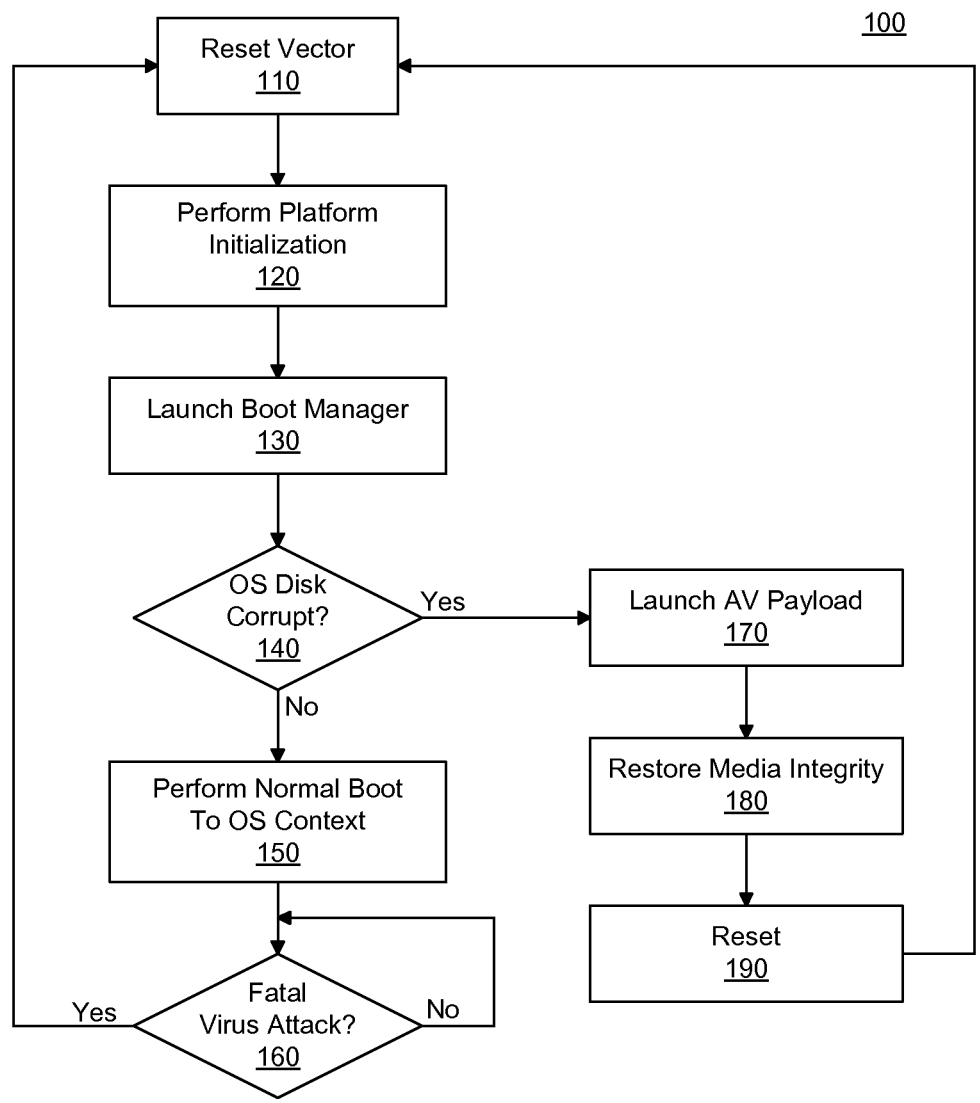
FIG. 2 is a flow diagram of a method in accordance with one embodiment.

Referring now to FIG. 2, shown is a flow diagram of a method in accordance with one embodiment of the present invention. As shown in FIG. 2, method 100 can be used both during normal boot operations, as well as for handling corruptions that occur due to, e.g., a virus present in a given computer system. Accordingly, the operations performed in method 100 can be performed by a combination of hardware, firmware and/or software, including code of a BIOS and an OS payload with AV code incorporated into a non-volatile storage of the system and executed on one or more processors of the system.

As shown in FIG. 2, method 100 can begin by jumping to a reset vector (block 110), which may be an initial code segment of a BIOS module. Next, control passes to block 120 where various hardware of the platform can be initialized. In one embodiment, initialization of a central processing unit (CPU), memory and a chipset may occur. Thus a minimum amount of system hardware can be initialized to enable basic operations to be performed in the system can occur.

Still referring to FIG. 2, next a boot manager may be launched (block 130). In one embodiment, this boot manager can be part of the BIOS, e.g., part of an EFI BIOS module. Next, control passes to diamond 140 where it can be determined whether the OS disk is corrupt. In one embodiment, this determination can be based on control passing from BIOS to the OS to see if it is able to boot. If this boot is not successful within a predetermined amount of time (e.g., according to a watchdog timer), a corruption can be indicated. Corruption can be determined in other manners such as by a failure to perform a UEFI secure boot, TXT launch failure, failure of an early OS-anti-malware driver, corruption of the EFI system partition, or corruption of the UEFI boot loader, among others.

This passing of control may occur within the EFI portion of a pre-boot environment. If this OS kernel portion is successfully enabled, then it is determined that the OS disk is not corrupt, and control passes to block 150 where a normal boot to the OS context can occur. Accordingly, the pre-boot environment is exited and a boot environment in which the full OS is loaded from its location, e.g., in disk storage, occurs. As such, normal system operations can occur. If during such operations it is determined that a fatal virus attack has occurred (as determined at diamond 160), control can pass back to block 110 discussed above.

Still referring to FIG. 2, if instead it is determined at diamond 140 that an OS disk corruption has occurred, control passes to block 170 where an AV payload may be launched. Note that prior to launching of this payload, the boot manager may perform a scan to determine whether other devices of the system may have a valid OS image target. Although the scope of the present invention is not limited in this regard, these possible targets may be a disk drive such as a small computer system interface (SCSI) device, a universal serial bus (USB)-connected media or so forth. If no such valid image is found in one of these targets, control at block 170 thus causes the AV payload (which may be located within a non-volatile storage of the system, e.g., a BIOS flash device that further includes a minimal OS payload) to be launched. Using this AV payload, which can include virus scanning, removal and recovery code, various operations to attempt to repair the corrupted disk can be performed. Accordingly, control passes to block 180 where an integrity of this corrupt media can be restored.

In various embodiments, this AV code, which can run on a given CPU of the system, may perform various operations to clear the disk of any viruses and restore normal disk operation. The operations performed by the AV code may include, but are not limited to, activities such as virus pattern matching, signature detection, etc., in the executable files. Similarly, the operations may also include data integrity verifications. In one embodiment, the standard operating system can register keys pertinent to blobs of data and/or various other software assets with the AV code for the purposes of encryption, integrity checks through key encryption mechanisms, which can be used by the AV code during recovery phase in the event of a corruption or virus attack. This AV code co-located with the OS payload portion may be used to help restore integrity of infected disk drives and fix system personality data stores such as the registry. System policy of this OS payload may cause a reset of the system once the integrity of the affected media is restored. Accordingly at the conclusion of such operations a reset operation may occur (block 190), such that control passes back to block 110, discussed above at a reset vector of the machine. Although shown at this high level in the embodiment of FIG. 2, understand the scope of the present invention is not limited in this regard.

Figure 3:
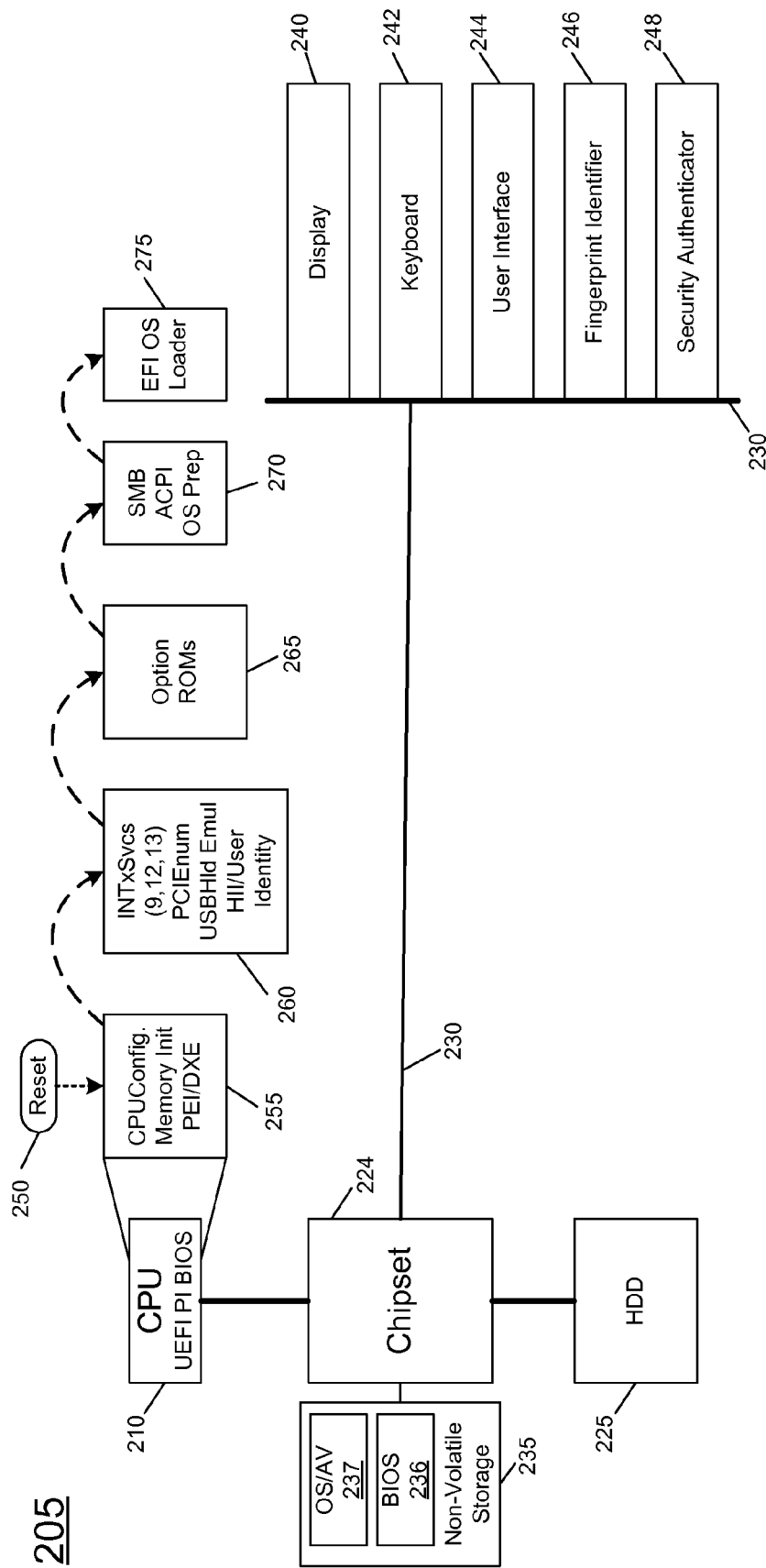
FIG. 3 is a boot flow diagram for booting a system in accordance with one embodiment in a full disk encryption (FDE) system.

Some embodiments may be used in connection with a platform that provides an extensible pre-boot authenticator (PBA) that can interact with security enhancements such as a full disk encryption (FDE) technique. Referring now to FIG. 3, shown is a boot flow diagram for booting a system in accordance with one embodiment of the present invention in a FDE system. As shown in FIG. 3, a system 205 includes various hardware resources, including a processor 210 such as a central processing unit (CPU) which can be a multicore processor configured to execute pre-boot code including a UEFI pre-initialization BIOS. A chipset may be coupled to processor 210. Specifically, chipset 224 may be one or more integrated circuits to interface with system memory, peripherals and so forth. One such component to which chipset 224 is coupled is a non-volatile storage 225, which may be a hard drive in which data may be encrypted using FDE. Of course, the scope of the present invention is not limited in this regard and embodiments can be implemented in other platforms without an FDE drive. For example, as described below, other embodiments may be used in portable or mobile low power devices that do not include a disk drive, and instead provide non-volatile storage via a solid state drive.

As further seen, a different non-volatile storage, namely non-volatile storage 235 may further be coupled to chipset

224. In the embodiment shown, this storage, which may be a flash or other non-volatile memory can include a BIOS module 236 and a combined OS/AV code module 237. In one embodiment each of these packages can be implemented in a separate volume of the non-volatile storage. Furthermore, by providing for this separate storage including the combined OS payload portion and AV code, greater security can be realized.

FIG. 3 further shows additional hardware that may be present in a system, including a display 240, a keyboard 242, a user interface 244 such as a mouse or other device, a fingerprint identifier 246, and a security authenticator 248, all of which may be coupled to chipset 224 via a trusted path 230.

As will be discussed further below, user input such as credential information, e.g., passwords, fingerprints, other codes and so forth, may be input via these user interfaces and provided via trusted path 230 to chipset 220, e.g., during pre-boot authorization activities.

FIG. 3 further shows a flow diagram for booting of system 205 in a UEFI environment in accordance with an embodiment of the present invention. As shown in FIG. 3, at a reset event 250, a host root of trust is established and various configuration and initialization operations may be performed using various code executed by processor 210, which may be stored in a first volume of non-volatile storage 235. In the embodiment of FIG. 3, first volume 235 may store a BIOS, while second volume 237 may store an OS payload portion and an antivirus software stack in accordance with an embodiment of the present invention.

In the embodiment of FIG. 3, the BIOS code may include a pre-EFI initialization environment (PEI) 255 in which minimal processor, chipset and platform configuration is performed to support memory discovery. Then a driver execution environment (DXE) phase may be performed in which firmware code may operate in the pre-boot environment, and which can be implemented as multiple drivers to complete initialization of the platform and devices. For example, device, bus or service drivers may be executed responsive to dispatch by a DXE dispatcher. Control thus passes to a PEI/DXE phase 260, which in turn initiates various enumeration and identification processes, including various interrupt service routines.

After such operations one or more option read-only memories (ROMs) 265 may be enabled which may execute various EFI drivers and extensions, including UEFI security extensions to obtain user input such as authorization information, credential information and so forth. The image may compare this information to stored credential information to determine whether to authorize the user. Further, the received user credential information may be stored in a given storage, such as a metadata storage of HDD 225.

During this portion of the pre-boot environment PBA code can run to authenticate the user and pass that information to security firmware. Then a secure exit can be performed to return to the regular environment to continue a bootstrap to the OS loader, if no corruption has been identified. If instead a corruption occurs, the AV code in non-volatile storage 235 may be executed.

After successful initiation of option ROMs, control passes to block 270 for further pre-OS operations such as enabling of a system management BIOS (SMB) and an Advanced Configuration and Power Interface (ACPI), and preparing for an OS load. Finally, if all such events are successful, a normal boot may occur via an EFI OS loader 275. While shown with this particular implementation in the embodiment of FIG. 3, the scope of the present invention is not limited in this regard. For example, in other embodiments a different manner of performing a signed/authenticated boot can be performed to ensure the boot is via an authorized user and of a valid and non-corrupted image.

Embodiments can be implemented in many different system types and form factors. For purposes of illustration, low level system software (such as a BIOS or other low level system code) can be co-located in a storage with a minimal OS payload along with AV code within the context of a smartphone, namely an Android™-based smartphone as shown in FIG. 4. As seen, FIG. 4 shows a block diagram of a software architecture 500 for an Android™-based platform. Assume that an application executing in this layer suffers a virus. Responsive to this, combined OS/AV code can resolve the virus and reset the device, as described above. In many embodiments, applications can be downloaded to the smartphone, e.g., via an application store provided by a service provider, and may be subject to virus or other malware attack. Various other user applications, ranging from communications applications, computing applications, e-mail applications and so forth, may further reside in application layer 510.

An application framework 520 executes below application layer 510. Application framework 520 may include various managers to manage functionality of the smartphone. In turn, various services, agents, native libraries and a runtime can execute below application framework 520. In the embodiment shown in FIG. 4, such components may include a security engine 530 on which an identification/authorization module can execute. Security engine 530 may further be configured with one or more digital rights management (DRM) technologies to control access to protected content. In addition, various native libraries 540 may be present to handle different services. A runtime 550 can include core libraries 552 and a process virtual machine (VM) 554. As further seen in FIG. 4, all of the above components can execute on a kernel 560, namely a Linux™ kernel. Such kernel can include various drivers for hardware interaction, networking interaction and so forth. As further seen, the software stack can include in addition to this full OS kernel, a minimal kernel that further includes AV code as discussed above. Thus as seen in FIG. 4, below kernel 560 may be a minimal kernel/AV code 570 which can be stored in a non-volatile memory in accordance with an embodiment of the present invention, e.g., as a separate volume within the storage device. Below this layer low level system software may execute. Specifically, system software 580 may include low level code to interoperate with the hardware of the system, and can be a BIOS in one embodiment.

Figure 5:
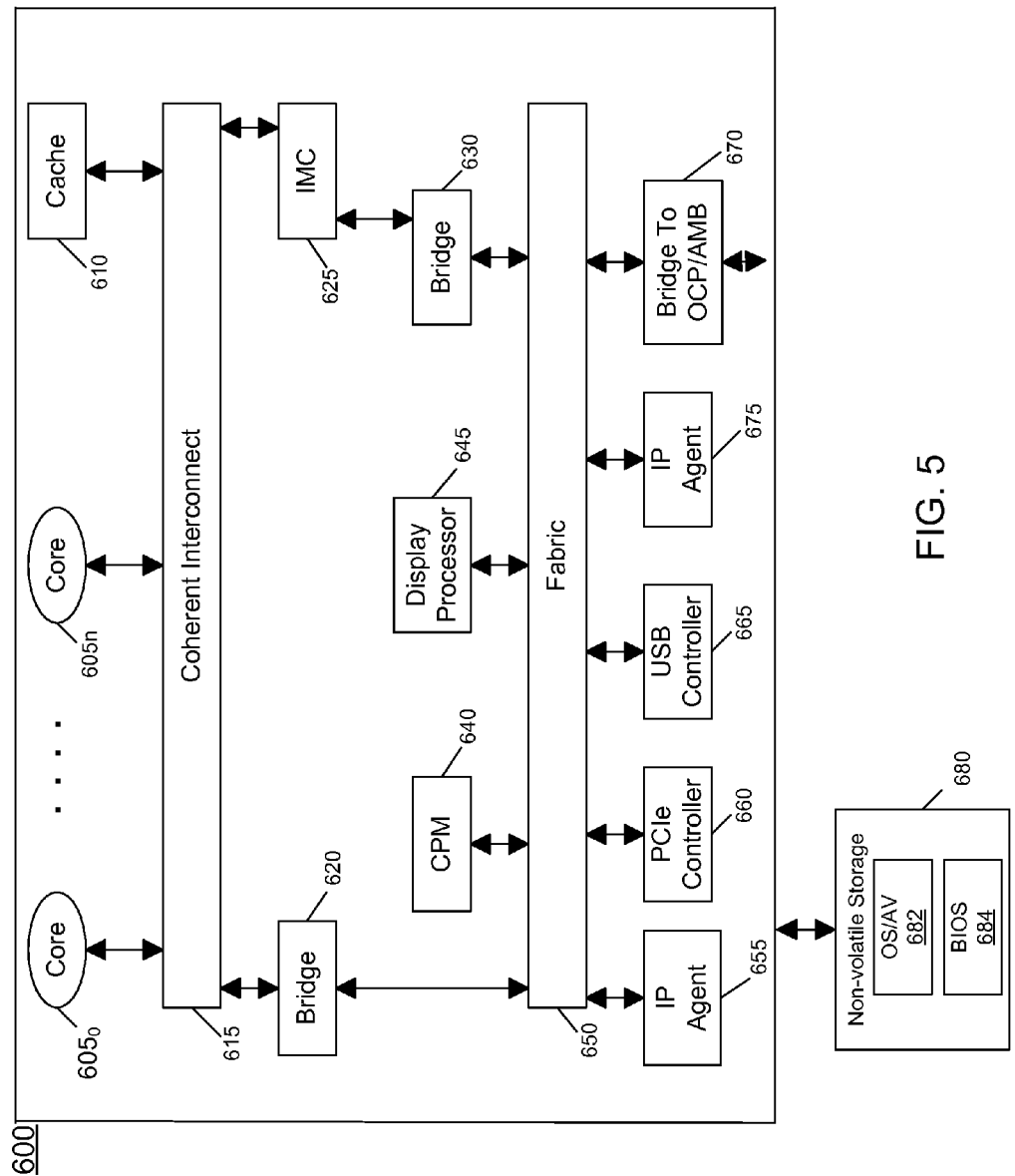
FIG. 5 is a high level block diagram of a system including a system on a chip (SoC) and a non-volatile storage in accordance with an embodiment.

Referring now to FIG. 5, shown is a high level block diagram of a system including a system on a chip (SoC) and a non-volatile storage in accordance with an embodiment of the present invention. As shown in FIG. 5, SoC 600 may include various components, all of which can be integrated on a single semiconductor die to provide for various processing capabilities at high speeds and low power, consuming a comparatively small amount of real estate. As seen in FIG. 5, SoC 600 includes a plurality of cores $605_0$-$605_n$. In various embodiments, cores 605 can be relatively simple in-order cores or more complex out-of-order cores. Or a combination of in-order and out-of-order cores can be present in a single SoC. As seen, cores 605 can be interconnected via a coherent interconnect 615, which further couples to a cache memory 610, e.g., a shared last level cache (LLC). Although the scope of the present invention is not limited in this regard, in one embodiment coherent interconnect 615 may be in accordance with the Quick Path Interconnect (QPI)™ specification available from Intel Corporation, Santa Clara, Calif.

As further seen in FIG. 5, coherent interconnect 615 may communicate via a bridge 620 to a fabric 650, that includes primary and sideband communication channels. Coherent interconnect 615 may further communicate via an integrated memory controller 615 to an off-chip memory (not shown for ease of illustration the embodiment of FIG. 5), and further through bridge 630 to fabric 650.

As further seen in FIG. 5, various components can couple to fabric 650 including a content processing module (CPM) 640 which can be used for performing various operations such as security processing, cryptographic functions and so forth. In addition, a display processor 645 can be part of a media processing pipeline that renders video for an associated display.

As further seen, fabric 650 may further couple to an IP agent 655, which can be a source agent such as a NIC, and an IP agent 675. To enable communication with other on-chip devices, fabric 650 may further communicate with a PCIe™ controller 660 and a universal serial bus (USB) controller 665, both of which can communicate with various devices according to these protocols. A bridge 670 can be used to communicate with additional components of other protocols, such as an open core protocol (OCP) or an ARM advanced microcontroller bus architecture (AMBA) protocol.

As further shown, a non-volatile storage 680 may be coupled to SoC 600. In the embodiment shown, storage 680 may include multiple volumes including a first volume 682 that includes an OS/AV payload and a second volume 684 which includes a BIOS. Although shown at this location of connection for communication, e.g., via PCIe™ controller 660 or USB controller 665, understand the scope of the present invention is not limited in this regard. For example, in other embodiments non-volatile storage 680 may couple directly to memory controller 625. Although shown with these particular components in the embodiment of FIG. 5, understand that the scope of the present invention is not limited in this way and in different embodiments additional or different components may be present.

Figure 6:
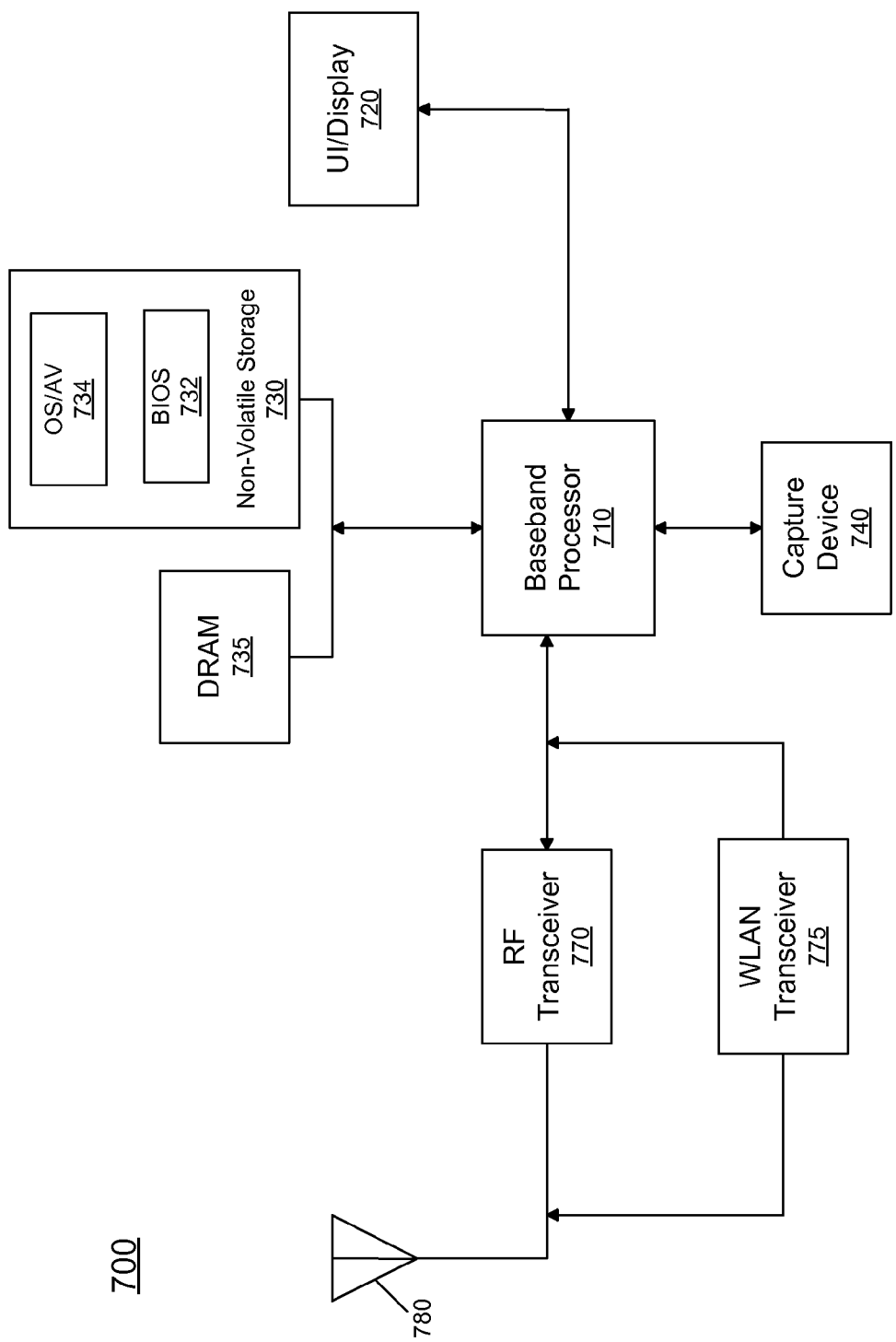
FIG. 6 is a block diagram of another example system with which embodiments can be used.

Referring now to FIG. 6, shown is a block diagram of another example system 700 with which embodiments can be used. As seen, system 700 may be a smartphone or other wireless communicator. As shown in the block diagram of FIG. 6, system 700 may include a baseband processor 710 on which applications that may be subject to attack can execute. In general, baseband processor 710 can perform various signal processing with regard to communications, as well as perform computing operations for the device. In turn, baseband processor 710 can couple to a user interface/display 720 which can be realized, in some embodiments by a touch screen display. In addition, baseband processor 710 may couple to a memory system including, in the embodiment of FIG. 6 a system memory, namely a dynamic random access memory (DRAM) 735. As further shown in FIG. 7, the memory subsystem may further include a non-volatile storage 730. In the embodiment shown, this storage can include multiple volumes including a first volume 732 that stores a BIOS and a second volume 734 which stores an OS/AV code. This code may be, in various embodiments, a minimal OS payload along with the AV code such that an attack to a full OS or applications running under this OS (which may be present within non-volatile storage 730 or another location on the device) can be segregated from this code repository. As further seen, baseband processor 710 can further couple to a capture device 740 such as an image capture device that can record video and/or still images.

To enable communications to be transmitted and received, various circuitry may be coupled between baseband processor 710 and an antenna 780. Specifically, a radio frequency (RF) transceiver 770 and a wireless local area network (WLAN) transceiver 775 may be present. In general, RF transceiver 770 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. Other wireless communications such as receipt or transmission of radio signals, e.g., AM/FM, or global positioning satellite (GPS) signals may also be provided. In addition, via WLAN transceiver 775, local wireless signals, such as according to a Bluetooth™ standard or an IEEE 802.11 standard such as IEEE 802.11a/b/g/n can also be realized. Although shown at this high level in the embodiment of FIG. 6, understand the scope of the present invention is not limited in this regard.

Figure 7:
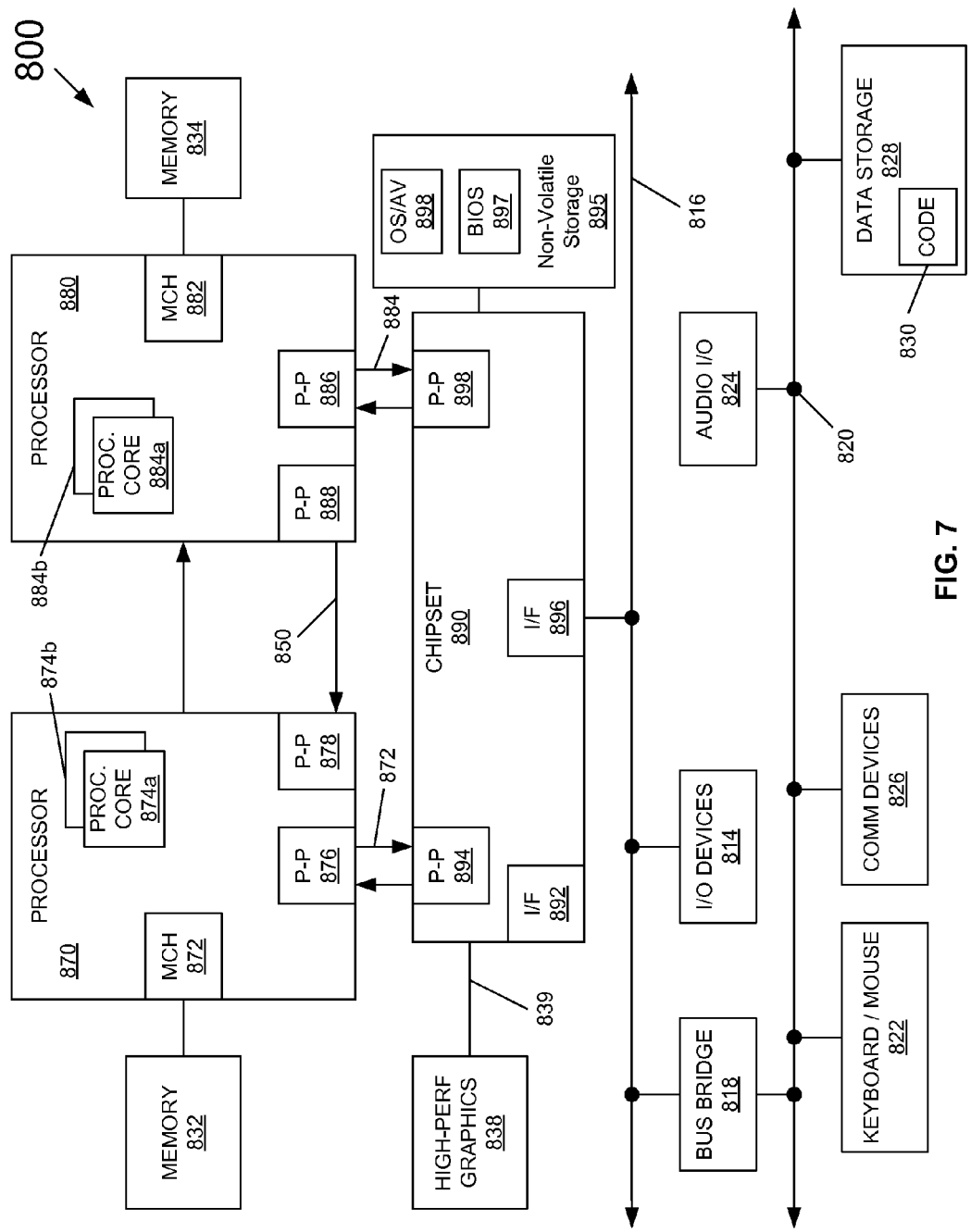
FIG. 7 is a block diagram of a system in accordance with another embodiment of the present invention.

Referring now to FIG. 7, shown is a block diagram of a system in accordance with another embodiment of the present invention. As shown in FIG. 7, multiprocessor system 800 is a point-to-point interconnect system, and includes a first processor 870 and a second processor 880 coupled via a point-to-point interconnect 850. As shown in FIG. 7, each of processors 870 and 880 may be multicore processors, including first and second processor cores (i.e., processor cores 874a and 874b and processor cores 884a and 884b), although potentially many more cores may be present in the processors.

Still referring to FIG. 7, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 7, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 7, chipset 890 includes P-P interfaces 894 and 898.

In the embodiment of FIG. 7, a non-volatile storage 895 may be directly coupled to chipset 890, and may include multiple volumes in accordance with an embodiment of the present invention, including a BIOS volume 897 and an OS/AV volume 898, which as described above may include a full AV software stack and a minimal OS payload portion.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 7, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, ultrabook, or so forth.

Embodiments may thus be used to counter and to recover from viruses and other malware that seek to attack a compute node, resulting in identity thefts, corrupted machine state such as registry, tampered data and contaminated executables. Still further, such embodiments can be used to counter viruses that seek attack on any anti-virus software by enabling BIOS to inspect and verify that the AV software successfully checked in. If it does not, the BIOS can cause a reboot of the system utilizing the payload such that the offending virus can be removed.

The following examples pertain to further embodiments. In one aspect, a method includes initializing a portion of a computing system in a pre-boot environment using a BIOS stored in a non-volatile storage of the computing system. After such initialization, a boot manager can be launched in the pre-boot environment to enable launch of an OS payload stored in a mass storage of the system. If however the OS payload is not successfully launched, an OS payload portion can be launched and an antivirus stack stored in the non-volatile storage can be used to restore an integrity of the mass storage. After restoring the integrity, a reset of the system may optionally occur to cause initializing the portion of the computer system in the pre-boot environment. In one embodiment, it may optionally be determined that the OS payload is not successfully launched if a timer set for a predetermined period expires prior to successful launch of the OS payload, or if the antivirus stack does not identify itself to the boot manager within a predetermined period, which may be the same or different than the above period.

The method may further include maintaining the antivirus stack and the OS payload portion in the non-volatile storage, where the OS payload corresponds to a shrink wrap OS instantiation. Such code may be stored in one volume of the non-volatile storage and the BIOS stored in another volume. In another embodiment, the OS payload portion may be a lightweight kernel to validate an image of the OS payload stored in the mass storage. Still further, a virus definition of the antivirus stack stored in the non-voltage storage can be updated in a secure management mode of the computing system.

Another aspect is directed to a non-volatile storage including a first volume to store a BIOS and a second volume to store an OS payload portion that includes an antivirus software stack. Note that this OS payload portion may be separate from and can be a subset of an OS kernel stored in a different storage. In this way, greater protection can be realized against malware that may attack this different storage or the kernel stored thereon. In one implementation, the BIOS can be configured to pass control to a boot manager of the OS stored in the different storage, and if this OS does not successfully launch in a given time period, the BIOS can cause execution of the antivirus software stack to restore integrity of this storage.

Note that the BIOS may pass control to a boot manager of the OS stored in the different storage, and if the OS does not successfully launch in a predetermined period, the BIOS causes execution of the antivirus software stack to restore an integrity of the different storage, which may be a mass storage. Also a virus definition of the antivirus stack stored in the non-voltage storage can be updated in a secure management mode of a computing system. In one embodiment, the OS payload portion may be a lightweight kernel to validate an image of the kernel stored in the different storage. The BIOS may further be configured to prevent launch of the OS kernel if the antivirus stack is not identified to the BIOS within a predetermined period.

A still further aspect is directed to a system having a processor to execute instructions, a first non-volatile storage coupled to the processor to store an OS kernel, and a second non-volatile storage to store a BIOS and an OS payload portion including an antivirus software stack. As such this OS payload portion is separate from and is a subset of the OS kernel. Further, the antivirus software stack can be used to restore an integrity of the first non-volatile storage subsequent to its corruption.

Note that the BIOS may launch a boot manager in a pre-boot environment to enable a launch of the OS kernel, and launch the OS payload portion and the antivirus software stack if the OS kernel is not successfully launched. A virus definition database for the antivirus software stack may be stored in the second non-volatile storage. As an example, the BIOS may launch the antivirus software stack if a timer set for a predetermined period expires prior to successful launch of the OS payload.

A still further aspect is directed to at least one machine readable medium including instructions that in response to being executed on a computing device, cause the device to perform various operations. In one implementation, these operations may include initialization of a hardware portion of the device in a pre-boot environment using BIOS stored in a non-volatile storage, launch of a boot manager in the pre-boot environment to enable an OS payload launch (where the OS is stored in a mass storage). Then, if the OS payload is not successfully launched, the instructions may cause execution of an OS payload portion and antivirus stack stored in the non-volatile storage to restore an integrity of the mass storage. Otherwise, a boot environment can be entered using the OS payload stored in the mass storage. Instructions that in response to being executed on the computing device, cause the computing device to, after restoring the integrity, perform a reset of the computing device to cause the hardware portion to be initialized in the pre-boot environment.

Note that these instructions can also cause the computing device to determine that the OS payload is not successfully launched if a timer set for a predetermined period expires prior to successful launch of the OS payload, and cause the device to maintain the antivirus stack and the OS payload portion in a first volume of the non-volatile storage and maintain the BIOS in a second volume of the non-volatile storage.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-volatile storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a processor to execute instructions;
   a chipset coupled to the processor;
   at least one user interface coupled to the chipset via a trusted path; and
   a non-volatile storage including a first volume to store a basic input/output system (BIOS) and a second volume to store an operating system (OS) payload portion including an antivirus software stack, wherein the OS payload portion is separate from and is a subset of an OS kernel stored in a different storage than the non-volatile storage and the antivirus software stack is to restore an integrity of the different storage subsequent to corruption of the different storage, wherein in a pre-boot environment, a user is to be authenticated based on user input via the at least one user interface, and if the user authentication is successful, the BIOS is to pass control to a boot manager of the OS kernel stored in the different storage, and if the OS kernel does not successfully launch in a predetermined period, the BIOS to cause execution of the antivirus software stack to restore the integrity of the different storage, wherein the different storage comprises a mass storage.

2. The apparatus of claim 1, wherein a virus definition of the antivirus stack stored in the non-voltage storage is to be updated in a secure management mode of a computing system.

3. The apparatus of claim 1, wherein the OS payload portion comprises a lightweight kernel to validate an image of the OS kernel stored in the different storage.

4. The apparatus of claim 1, wherein the BIOS is to prevent launch of the OS kernel if the antivirus stack is not identified to the BIOS within the predetermined period.

5. A system comprising:
   a processor to execute instructions;
   a chipset coupled to the processor;
   at least one user interface coupled to the chipset via a trusted path;
   a first non-volatile storage coupled to the processor to store an operating system (OS) kernel; and
   a second non-volatile storage to store a basic input/output system (BIOS) and an operating system (OS) payload portion including an antivirus software stack, wherein the OS payload portion is separate from and is a subset of the OS kernel and the antivirus software stack is to restore an integrity of the first non-volatile storage subsequent to corruption of the first non-volatile storage, the first non-volatile storage a different storage than the second non-volatile storage, wherein in a pre-boot environment, a user is to be authenticated based on user input via the at least one user interface, and if the user authentication is successful, the BIOS is to pass control to a boot manager of the OS kernel stored in the first non-volatile storage, and if the OS kernel does not successfully launch in a predetermined period, the BIOS to cause execution of the antivirus software stack to restore the integrity of the first non-volatile storage.

6. The system of claim 5, wherein the BIOS is to launch the OS payload portion and the antivirus software stack if the OS kernel is not successfully launched.

7. The system of claim 5, further comprising a virus definition database for the antivirus software stack stored in the second non-volatile storage.

8. The system of claim 5, wherein the BIOS is to launch the antivirus software stack if a timer set for the predetermined period expires prior to successful launch of the OS payload.

9. The system of claim 5, wherein the first non-volatile storage comprises a solid state drive for the system.

10. At least one non-transitory machine readable medium comprising a plurality of instructions that in response to being executed on a computing device, cause the computing device to:
    initialize a hardware portion of the computing device in a pre-boot environment using a basic input/output system (BIOS) stored in a non-volatile storage of the computing device;
    receive user input of a user from at least one user interface of the computing device, via a trusted path;
    authenticate the user based on the user input;
    responsive to not authenticating the user, execute an antivirus stack stored in the non-volatile storage;
    responsive to authenticating the user, launch a boot manager in the pre-boot environment to enable a launch of an operating system (OS) payload stored in a mass storage of the computing device, if the OS payload is not successfully launched in a predetermined period, execute an OS payload portion stored in the non-volatile storage and the antivirus stack to restore an integrity of the mass storage, and otherwise enter into a boot environment using the OS payload stored in the mass storage, the mass storage separate from the non-volatile storage.

11. The at least one non-transitory machine readable medium device of claim 10, further comprising instructions that in response to being executed on the computing device, cause the computing device to, after restoring the integrity, perform a reset of the computing device to cause the hardware portion to be initialized in the pre-boot environment.

12. The at least one non-transitory machine readable medium device of claim 10, further comprising instructions that in response to being executed on the computing device, cause the computing device to determine that the OS payload is not successfully launched if a timer set for the predetermined period expires prior to successful launch of the OS payload.

13. The at least one non-transitory machine readable medium device of claim 10, further comprising instructions that in response to being executed on the computing device, cause the computing device to maintain the antivirus stack and the OS payload portion in a first volume of the non-volatile storage and maintain the BIOS in a second volume of the non-volatile storage.

14. A method comprising:
    initializing a portion of a computing system in a pre-boot environment using a basic input/output system (BIOS) stored in a non-volatile storage of the computing system;
    receiving user input of a user from at least one user interface of the computing system, via a trusted path;
    authenticating the user based on the user input;
    responsive to not authenticating the user, executing an antivirus stack stored in the non-volatile storage;
    responsive to authenticating the user, launching a boot manager in the pre-boot environment to enable a launch of an operating system (OS) payload stored in a mass storage of the computing system, the mass storage separate from the non-volatile storage; and
    if the OS payload is not successfully launched in a predetermined period, executing an OS payload portion and the antivirus stack stored in the non-volatile storage to restore an integrity of the mass storage, and otherwise entering into a boot environment using the OS payload stored in the mass storage.

15. The method of claim 14, further comprising after restoring the integrity, performing a reset of the computing system to cause initializing the portion of the computer system in the pre-boot environment.

16. The method of claim 14, further comprising determining that the OS payload is not successfully launched if a timer set for the predetermined period expires prior to successful launch of the OS payload.

17. The method of claim 14, further comprising maintaining the antivirus stack in the non-volatile storage.

18. The method of claim 17, further comprising maintaining the OS payload portion in the non-volatile storage, the OS payload corresponding to a shrink wrap OS instantiation.

19. The method of claim 17, wherein the OS payload portion comprises a lightweight kernel to validate an image of the OS payload stored in the mass storage.

20. The method of claim 14, further comprising updating a virus definition of the antivirus stack stored in the non-voltage storage in a secure management mode of the computing system.

21. The method of claim 14, further comprising maintaining the BIOS in a first volume of the non-volatile storage and maintaining the OS payload portion in a second volume of the non-volatile storage.

22. The method of claim 14, further comprising preventing the launch of the OS if the antivirus stack does not identify itself to the boot manager within the predetermined period.

23. The method of claim 14, further comprising determining the mass storage is corrupt if a secure boot does not occur, a trusted execution launch fails, or a system partition fails.

24. The method of claim 14, further comprising maintaining the mass storage with full disk encryption (FDE).

25. The method of claim 14, further comprising updating a virus definition of the antivirus stack stored in one of a trusted platform module (TPM) and an antivirus cloud database service.

* * * * *